(12) United States Patent
Schaarschmidt et al.

(10) Patent No.: US 7,993,241 B2
(45) Date of Patent: Aug. 9, 2011

(54) METHOD FOR CONTROLLING AN UPSHIFT PROCESS IN A DUAL-CLUTCH GEARBOX

(75) Inventors: Reinhard Schaarschmidt, Illingen (DE); Joachim Buerkle, Benningen (DE); Mathias Himmelsbach, Heilbronn (DE); Roland Pfister, Schramberg (DE); Oliver Ottinger, St. Georgen (DE); Andreas Schaefer, Abstatt (DE); Uwe Leibbrand, Ingersheim (DE); Raphael Ahne, Ludwigsburg (DE); Tobias Kalisch, Villingen-Schwenningen (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 12/691,548

(22) Filed: Jan. 21, 2010

(65) Prior Publication Data
US 2010/0184561 A1 Jul. 22, 2010

Related U.S. Application Data

(63) Continuation of application No. PCT/EP2008/006111, filed on Jul. 25, 2008.

(30) Foreign Application Priority Data

Jul. 26, 2007 (DE) .......................... 10 2007 036 545

(51) Int. Cl.
*B60W 10/02* (2006.01)
(52) U.S. Cl. .......................................... 477/80; 477/86

(58) Field of Classification Search ..................... 477/70, 477/79, 80, 86
See application file for complete search history.

(56) References Cited

U.S. PATENT DOCUMENTS 5,899,829 A * 5/1999 Salecker et al. ................ 477/78
(Continued)

FOREIGN PATENT DOCUMENTS
DE 197 09 419 A1 10/1997
(Continued)

OTHER PUBLICATIONS

International Preliminary Report on Patentability; PCT Application No. PCT/EP2008/006111, Filing Date: Jul. 25, 2008.

*Primary Examiner* — Ha D. Ho
(74) *Attorney, Agent, or Firm* — Knobbe, Martens, Olson & Bear, LLP

(57) ABSTRACT

A method for controlling shift process in dual-clutch gearbox having dual-clutch gearbox input shaft connected to a drive engine, having two friction clutches and two partial gearboxes, comprising detecting demand for a shift from source gear into target gear, the source gear and target gear assigned to first partial gearbox; opening friction clutch assigned to first partial gearbox and closing friction clutch assigned to other partial gearbox to transmit drive power via intermediate gear of other partial gearbox; disengaging source gear and temporarily conducting a pressure-exertion process in friction clutch assigned to the first partial gearbox before engagement of target gear, with rotational speed of first partial gearbox being reduced due to the pressure-exerting operation according to drag torque, opening friction clutch assigned to other partial gearbox and closing friction clutch assigned to first partial gearbox to transfer drive power to the target gear without an interruption in tractive force.

11 Claims, 8 Drawing Sheets

U.S. PATENT DOCUMENTS

| | | | |
|---|---|---|---|
| 5,915,512 A * | 6/1999 | Adamis et al. | 192/3.61 |
| 7,258,032 B2 * | 8/2007 | Kim | 74/330 |
| 7,416,514 B2 * | 8/2008 | Dell et al. | 477/80 |
| 7,748,287 B2 * | 7/2010 | Hatori et al. | 74/340 |
| 7,779,712 B2 * | 8/2010 | Mesiti et al. | 74/330 |
| 2002/0033059 A1 * | 3/2002 | Pels et al. | 74/329 |

FOREIGN PATENT DOCUMENTS

| | | |
|---|---|---|
| DE | 199 39 334 A1 | 3/2001 |
| DE | 101 33 695 A1 | 3/2002 |
| DE | 103 49 220 A1 | 2/2005 |
| DE | 10 2006 002 490 A1 | 8/2006 |
| DE | 10 2006 010 934 A1 | 9/2006 |

* cited by examiner

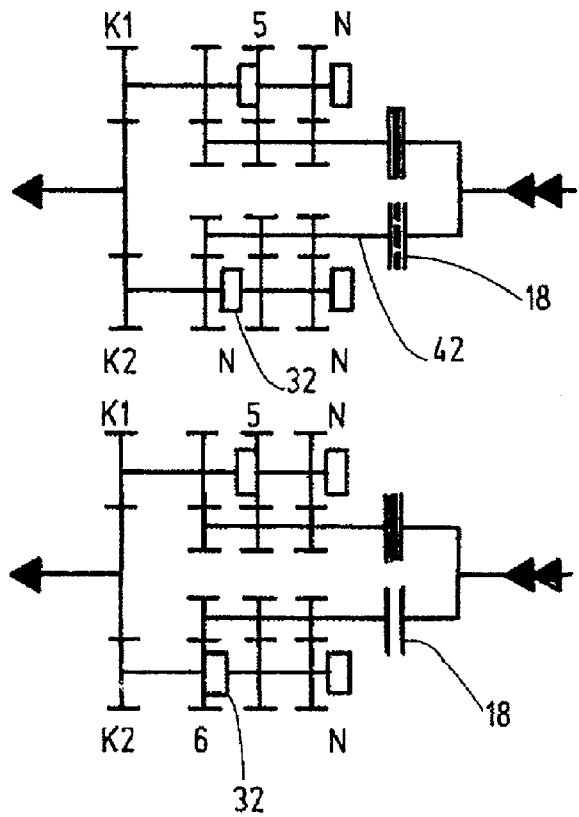
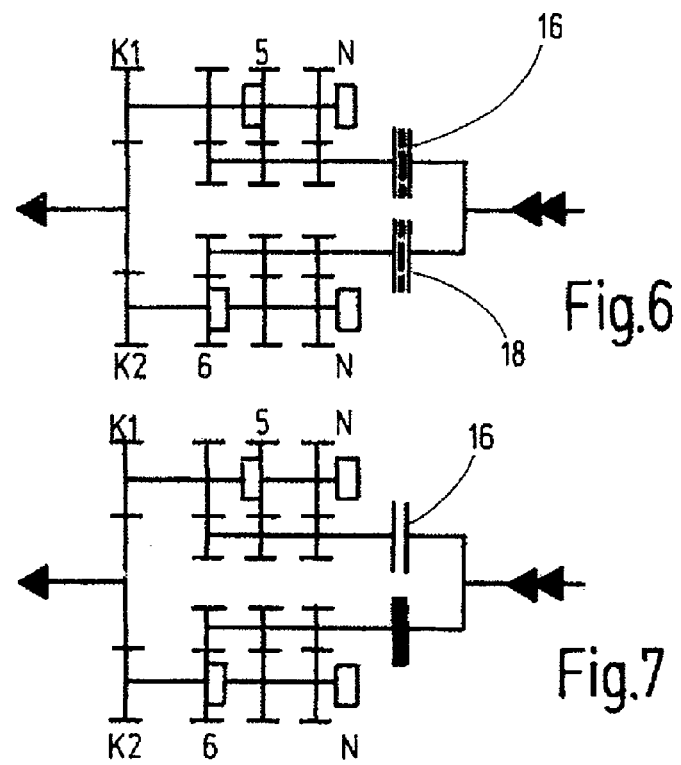

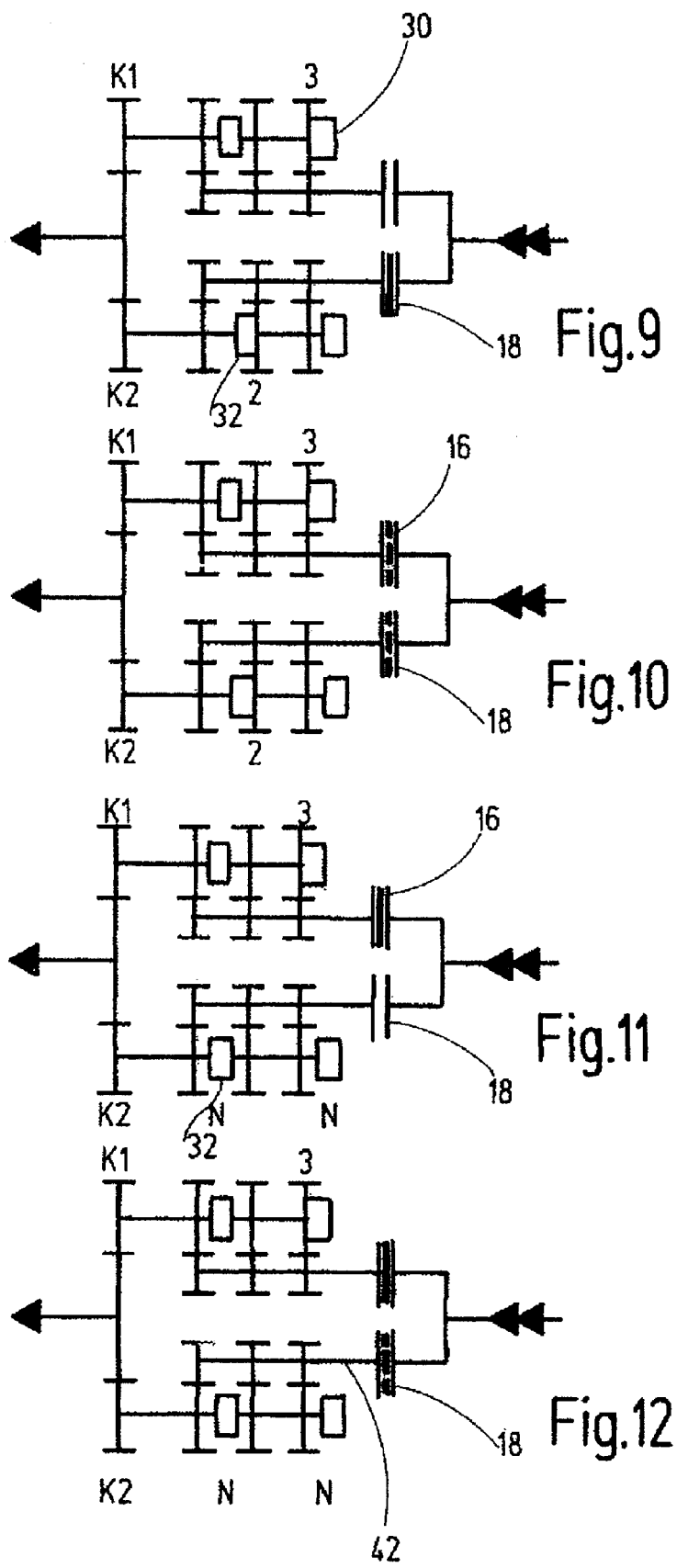

Fig. 19

| rotational speed in lower gear | Manual control shifting (MT) | | | | Double shift process without clutch strategy | | | | Double shift process with clutch strategy | | | | driving gear |
|---|---|---|---|---|---|---|---|---|---|---|---|---|---|
| | gear shift | rotational speed difference | step speed | sliding speed | gear shift | rotational speed difference | step speed | sliding speed | gear shift | rotational speed difference | step speed | sliding speed | |
| 0.50 x n_max (3250 rpm) | 2-3 | 784 | 1126 | 2.94 | 1-3 | 1346 | 1933 | 5.04 | 1-3 | 486 | 698 | 1.82 | 2 |
| | 2-1 | 315 | 1235 | 1.18 | 3-1 | 494 | | 1.85 | 3-1 | 315 | 1235 | 1.18 | |
| | 3-4 | 920 | 939 | 3.44 | 2-4 | 1705 | 1740 | 6.38 | 2-4 | 601 | 614 | 2.25 | 3 |
| | 3-2 | 464 | 1126 | 1.77 | 4-2 | 717 | | 2.74 | 4-2 | 464 | 1126 | 1.77 | |
| | 4-5 | 953 | 808 | 3.57 | 3-5 | 1785 | 1515 | 6.68 | 3-5 | 677 | 574 | 2.53 | 4 |
| | 4-3 | 654 | 939 | 2.45 | 5-3 | 1054 | | 3.95 | 5-3 | 654 | 939 | 2.45 | |
| | 5-6 | 1042 | 694 | 3.90 | 4-6 | 1993 | 1330 | 7.46 | 4-6 | 783 | 522 | 2.93 | 5 |
| | 5-4 | 791 | 808 | 2.96 | 6-4 | 1302 | | 4.87 | 6-4 | 791 | 808 | 2.96 | |
| 0.75 x n_max (4875 rpm) | 2-3 | 1176 | 1689 | 4.40 | 1-3 | 2019 | 2900 | 7.56 | 1-3 | 729 | 1047 | 2.73 | 2 |
| | 2-1 | 473 | 1852 | 1.77 | 3-1 | 740 | | 2.77 | 3-1 | 473 | 1852 | 1.77 | |
| | 3-4 | 1380 | 1409 | 5.17 | 2-4 | 2557 | 2610 | 9.57 | 2-4 | 902 | 921 | 3.38 | 3 |
| | 3-2 | 696 | 1689 | 2.66 | 4-2 | 1075 | | 4.11 | 4-2 | 696 | 1689 | 2.66 | |
| | 4-5 | 1429 | 1212 | 5.35 | 3-5 | 2678 | 2271 | 10.03 | 3-5 | 1016 | 862 | 3.80 | 4 |
| | 4-3 | 981 | 1409 | 3.67 | 5-3 | 1581 | | 5.92 | 5-3 | 981 | 1409 | 3.67 | |
| | 5-6 | 1563 | 1042 | 5.85 | 4-6 | 2992 | 1995 | 11.20 | 4-6 | 1174 | 783 | 4.40 | 5 |
| | 5-4 | 1187 | 1212 | 4.44 | 6-4 | 1954 | | 7.32 | 6-4 | 1187 | 1212 | 4.44 | |
| n_max (6500 rpm) | 2-3 | 1569 | 2252 | 5.87 | 1-3 | 2693 | 3866 | 10.08 | 1-3 | 973 | 1397 | 3.64 | 2 |
| | 2-1 | 631 | 2470 | 2.36 | 3-1 | 987 | | 3.70 | 3-1 | 631 | 2470 | 2.36 | |
| | 3-4 | 1841 | 1879 | 6.89 | 2-4 | 3409 | 3480 | 12.76 | 2-4 | 1203 | 1228 | 4.50 | 3 |
| | 3-2 | 927 | 2252 | 3.54 | 4-2 | 1483 | | 5.48 | 4-2 | 927 | 2252 | 3.54 | |
| | 4-5 | 1906 | 1616 | 7.14 | 3-5 | 3571 | 3028 | 13.37 | 3-5 | 1355 | 1149 | 5.07 | 4 |
| | 4-3 | 1309 | 1879 | 4.90 | 5-3 | 2109 | | 7.90 | 5-3 | 1309 | 1879 | 4.90 | |
| | 5-6 | 2083 | 1389 | 7.80 | 4-6 | 3989 | 2659 | 14.93 | 4-6 | 1565 | 1044 | 5.86 | 5 |
| | 5-4 | 1583 | 1616 | 5.93 | 6-4 | 2605 | | 9.79 | 6-4 | 1583 | 1616 | 5.93 | |

80 — Manual control shifting (MT); 82 — Double shift process without clutch strategy; 84 — Double shift process with clutch strategy

METHOD FOR CONTROLLING AN UPSHIFT PROCESS IN A DUAL-CLUTCH GEARBOX

CROSS-REFERENCE TO RELATED APPLICATIONS

This application is a continuation of International Patent Application No. PCT/EP2008/006111, filed Jul. 25, 2008, pending, which claims the priority of German Patent Application No. 10 2007 036 545.6, filed Jul. 26, 2007, the entireties of which are incorporated by reference herein and made a part of the present disclosure.

BACKGROUND OF THE INVENTION

The present invention relates to a method for controlling an upshift process in a dual-clutch gearbox having a dual-clutch gearbox input shaft connected to a drive engine, having two friction clutches and having two partial gearboxes.

Dual-clutch gearboxes of said type are generally known. Even-numbered gear stages are assigned to one of the two partial gearboxes while odd-numbered gear stages are assigned to the other partial gearbox. By means of overlapping actuation of the friction clutches assigned to the partial gearboxes, it is possible to carry out gearshifts from one gear to the next without an interruption in tractive force.

Numerous methods have become known for carrying out shift processes in dual-clutch gearboxes.

For example, DE 103 49 220 A1 describes a method of said type in which comfort is improved by virtue of the control of the shift process in the gearbox from the source gear to the target gear and the control of the associated friction clutch taking place such that the engine rotational speed runs in the direction of the synchronizing rotational speed of the target gear with a virtually constant gradient.

Document DE 10 2006 010 934 A1 proposes the damping of vibrations in the active and/or inactive partial gearbox by engaging the associated clutch before the synchronization in the active partial gearbox, and subsequently carrying out a synchronization.

The method is designed to prevent so-called synchronizing shocks during downshift processes (for example from the fourth into the second gear).

Document DE 10 2006 002 490 deals with a similar problem and discloses a method for carrying out a double traction downshift, with a gear temporarily being engaged whose gradation lies between that of the source gear and that of the target gear.

Here, the intention is to make it possible, during the engagement of the intermediate gear, for a torque shock to be transmitted into the free partial gearbox via the friction clutch which is assigned to said partial gearbox, in order to thereby accelerate approximately to the target rotational speed in a similar manner to double-declutching, as was required during downshifting in manual gearboxes before the introduction of synchronizers.

BRIEF SUMMARY OF THE INVENTION

Taking this as a starting point, the problem addressed by the invention is that of further optimizing the shift processes in dual-clutch gearboxes.

The above object is achieved by means of a method for controlling a double upshift process in a dual-clutch gearbox, having a dual-clutch gearbox input shaft connected to a drive engine, having two friction clutches and having two partial gearboxes, the method comprising the steps:

detecting a demand for a shift from a low source gear into a higher target gear, with the source gear and the target gear being assigned to one of the two partial gearboxes of the dual-clutch gearbox, opening the friction clutch which is assigned to the one partial gearbox and closing the friction clutch assigned to the other partial gearbox in order to transmit drive power via an intermediate gear of the other partial gearbox without an interruption in tractive force, with the rotational speed of the dual-clutch gearbox input shaft being reduced in this way, disengaging the source gear and temporarily exerting pressure in the friction clutch assigned to the one partial gearbox before the engagement of the target gear, with the rotational speed of the one partial gearbox being reduced as a result of the pressure-exerting operation by virtue of a drag torque being transmitted to the one partial gearbox by the dual-clutch gearbox input shaft which is rotating at a reduced rotational speed, such that a synchronization of the target gear may be begun at a reduced differential rotational speed, and opening the friction clutch assigned to the other partial gearbox and closing the friction clutch assigned to the one partial gearbox in order to transfer drive power to the target gear without an interruption in tractive force.

The subclaims specify preferred embodiments.

The above object is also achieved by means of a method for eliminating a shift blockade during the engagement of a gear in an automatic gearbox, having the steps:

detecting a shift blockade during the engagement of a target gear by means of a target shift clutch, when a shift blockade is detected, exerting pressure in the input-side friction clutch, with a drag torque being transmitted from the input of the gearbox to the gearbox such that the target shift clutch is rotated in order to eliminate the shift blockade, with it subsequently being possible for a renewed synchronization of the target shift clutch to be begun.

It is clear from the above that, during multiple upshifts, in particular during double upshifts (for example from one to three, from two to four, from three to five, from four to six, etc.) the synchronization work to be performed by the synchronizers of the respective target gear can be reduced significantly. The differential rotational speeds or sliding speeds at the synchronizers of the target gears may be reduced in each case to values which enable the use of comparatively cheap and compact synchronizers.

An upshift from a low source gear into a higher target gear is also intended to encompass a shift from the reverse gear into a forward gear. In said embodiment, relatively high differential rotational speeds may likewise arise at the synchronizer of the target gear, specifically on account of the rotational speed reversal in the reverse gear stage.

The object is thereby solved in its entirety.

In general, the control method according to the invention can be used in dual-clutch gearboxes during any upshift process. It is however particularly preferable for the method to be implemented, as a function of certain operating states of the vehicle, only when a reduction in the differential rotational speed at the synchronizer of the target gear is actually required or advantageous. In this way, in other operating states, the shift times can be shortened and the wear of the gearbox-input-side friction clutches reduced.

It is thus particularly preferable for the pressure-exerting operation to be carried out when the differential rotational speed is greater than a certain threshold value.

The differential rotational speed is dependent on the rotational speed of the dual-clutch gearbox input shaft (that is to say the rotational speed of the drive engine) and on the gear stage step which is supposed to be initiated with the shift process. The implementation of the method according to the invention may be advantageous in particular when an upshift process is to be carried out from a source gear when the drive engine rotational speed is very high (for example during a fast acceleration process).

According to a further preferred embodiment, the pressure-exerting process is carried out only when the sliding speed of a friction ring (e.g. synchronizer ring) of the target shift clutch is greater than a certain threshold value.

The sliding speed of the friction ring of the target shift clutch is the circumferential speed of the friction ring at the friction point (synchronizing point). The sliding speed is generally directly proportional to the above-specified differential rotational speed. The sliding speed is however a good criteria for establishing the necessity for the pressure-exerting process (which is also referred to below if appropriate as double-declutching).

Overall, it is also advantageous if the pressure-exerting process is carried out only when the rotational speed of the one partial gearbox is greater than the rotational speed of the dual-clutch gearbox input shaft.

During an upshift process, such double-declutching is expedient only when the differential rotational speed is reduced in this way. By monitoring the rotational speed of the one partial gearbox and monitoring the rotational speed of the dual-clutch gearbox input shaft, it can consequently be established whether double-declutching is expedient (or would even cause damage).

Here, the rotational speed of the one partial gearbox is to be understood generally to mean the input rotational speed of said partial gearbox, that is to say the rotational speed of the output element of the associated friction clutch.

During an upshift process, the target rotational speed generally lies below the rotational speed of the input shaft of the one partial gearbox. Said rotational speed falls on account of the inherent inertia. At some torques, however, said rotational speed drop on account of the inherent inertia may take place too slowly to arrive at a suitable sliding speed. The method according to the invention may be used in such situations.

Overall, it is also advantageous if the drag torque which is transmitted to the one partial gearbox is built up gradually.

Shocks in the drivetrain can be reduced in this way.

Here, it is particularly advantageous if the drag torque is built up in a ramped or stepped fashion.

The build-up may follow a linear characteristic curve or a parabolic characteristic curve.

According to a further embodiment which is preferable overall, the pressure-exerting process is ended when a predetermined stop condition is met.

The stop condition implies generally that the pressure-exerting process is no longer necessary or no longer admissible.

This may for example encompass monitoring of the sliding speed. If said sliding speed has fallen or will fall to a sufficiently low value, the pressure-exerting process may be ended.

Here, the ending of the pressure-exerting process takes place such that the transmission of the drag torque to the one partial gearbox is ended abruptly.

The shift process can be shortened overall in this way.

According to an alternative embodiment, the ending of the pressure-exerting process takes place such that the transmission of the drag torque to the one partial gearbox is ended gradually, in particular in a ramped or stepped fashion. In this way, shocks or the excitation of vibrations in the drive train can be reduced.

It is particularly preferable for the stop condition to be a defined threshold value of a rate of change of a rotational speed of the one partial gearbox.

This may for example be the rotational speed of the input shaft of the partial gearbox.

In this way, it is achieved that the pressure-exerting process can be ended as early as possible. Specifically, when the rate of change of the rotational speed of the partial gearbox reaches a certain threshold value, it may be assumed that the sliding speed will decrease relatively quickly proceeding from this point, such that the pressure-exerting process can be ended as early as possible.

Overall, it is preferable for the synchronization of the target gear to take place only once the friction clutch assigned to the one partial gearbox is opened again after the temporary exertion of pressure.

Gearbox blockades can be prevented in this way.

It is also advantageous if an actuator for the friction clutch assigned to the one partial gearbox, during the transfer of the drive power to the other partial gearbox, holds said friction clutch in a position a short distance before the contact point (kiss or touch point) in order to be able to carry out the temporary exertion of pressure with a relatively short reaction time if appropriate.

In other words, the one friction clutch is not fully opened (that is to say not fully emptied in the case of a hydraulically actuated friction clutch) after the transfer of the drive power to the other partial gearbox (in order to maintain the tractive force via the intermediate gear). In fact, said friction clutch of the one partial gearbox is held a short distance before the contact point in order to be able to initiate the pressure-exerting process which may be required as quickly as possible.

It is also advantageous if the source gear is disengaged under preload such that the friction clutch assigned to the one partial gearbox need not be opened fully when the drive power is transferred to the other partial gearbox.

This can also lead to faster shift processes.

In other words, the actuator is preloaded in the disengagement direction in order to disengage the source gear. Once the torque transmitted via the source gear falls below a certain value, the source gear is disengaged on account of the preload, wherein the friction clutch of the one partial gearbox need not yet be fully opened here. Once the source gear is disengaged, the transfer of the drive power to the other partial gearbox may be begun immediately in order to transmit drive power via the intermediate gear.

In a further preferred embodiment, it is provided that the friction clutch assigned to the one partial gearbox transmits no more than 20 Nm, preferably no more than 15 Nm and in particular no more than 10 Nm during the temporary exertion of pressure.

It has been found that even a pressure-exerting process in which such a small torque is transmitted from the dual-clutch gearbox input shaft to the one partial gearbox is adequate to effectively reduce the differential rotational speed at the synchronizer of the target gear.

It is self-evident that the features specified above and the features yet to be explained below may be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail below. In the drawing:

FIGS. 2-7 show views of the dual-clutch gearbox of FIG. 1 in different states during the implementation of a method according to the invention for controlling a double upshift;

FIGS. 9-16 show illustrations of the dual-clutch gearbox of FIG. 1 in different phases during an implementation of a further embodiment of the method according to the invention for controlling an upshift process, specifically during a quadruple upshift;

FIG. 19 shows tables of different shift processes at different rotational speed levels in order to show the advantages of the control method according to the invention.

DETAILED DESCRIPTION OF THE DISCLOSURE

Figure 1:
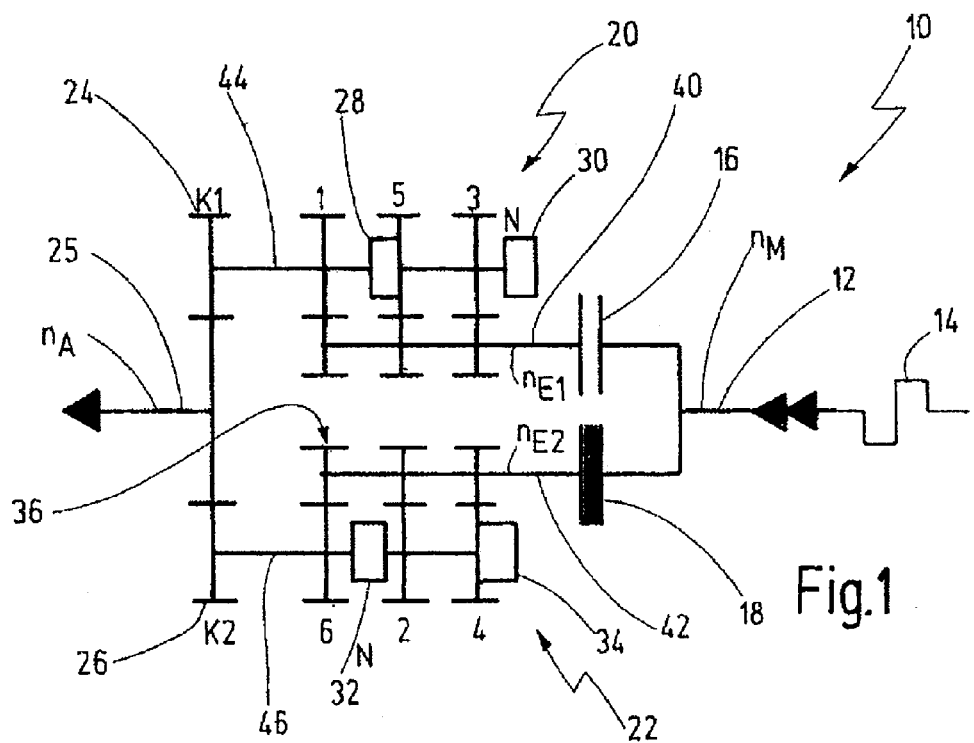
FIG. 1 shows a schematic illustration of a dual-clutch gearbox in which the methods according to the invention can be implemented, with a source gear being engaged.

In FIG. 1, a dual-clutch gearbox is illustrated in schematic form and is denoted by 10.

The dual-clutch gearbox 10 has a dual-clutch gearbox input shaft 12 which is connected to the crankshaft of a drive engine 14 (such as an internal combustion engine).

The dual-clutch gearbox comprises a first friction clutch 16 and a second friction clutch 18. The input elements of the two friction clutches 16, 18 are connected to the dual-clutch gearbox input shaft 12. The rotational speed of said dual-clutch gearbox input shaft 12 is denoted in FIG. 1 by $n_M$.

An output element of the first friction clutch 16 is connected to a first partial gearbox 20. The first partial gearbox 20 contains the gear stages 1, 3 and 5 and is of the countershaft type. An output element of the second friction clutch 18 is connected to a second partial gearbox 22 which contains the gear stages 2, 4, 6 and which is likewise of the countershaft type.

For reasons of simple illustration, a reverse gear stage is not illustrated. Said reverse gear stage may be assigned either to the first or the second partial gearbox 20, 22.

The first partial gearbox 20 is connected by means of a first constant gear set 24 to a dual-clutch gearbox output shaft 25 whose rotational speed is denoted by $n_A$. Correspondingly, the second partial gearbox 22 is connected by means of a second constant gear set 26 to the dual-clutch gearbox output shaft 25.

The dual-clutch gearbox output shaft 25 may for example be connected via a differential gear to drive wheels of a motor vehicle, for example of a passenger motor vehicle or else of a utility vehicle.

The first partial gearbox 20 has a first shift clutch pack 28 for actuating the gear stages 1 and 5. FIG. 1 shows that the shift clutch pack 28 is switched such that the gear stage 5 is engaged. Furthermore, the first partial gearbox 20 has a shift clutch 30 for the gear stage 3.

The second partial gearbox 22 has a shift clutch pack 32 for the gear stages 2/6 and a shift clutch 34 for the gear stage 4. In the present case, it is shown that the shift clutch 34 is switched such that the gear stage 4 is engaged.

It is also illustrated in FIG. 1 that the second friction clutch 18 is closed. Accordingly, the drive power is transmitted from the drive engine 14 via the second friction clutch 18 and the second partial gearbox 22 to the dual-clutch gearbox output shaft 25, specifically via the gear stage 4. In the other partial gearbox 20, the gear stage 5 is pre-selected since the vehicle is performing an acceleration process. If the vehicle were decelerating, it would for example also be possible for the gear stage 3 to be pre-selected in the first partial gearbox 20 (depending on the gear pre-selection strategy).

The first partial gearbox 20 has a first gearbox input shaft 40 which is connected to the output element of the first friction clutch 16. The rotational speed of the first gearbox input shaft 40 is denoted by $n_{E1}$. The second partial gearbox 22 correspondingly has a second gearbox input shaft 42 whose rotational speed is denoted by $n_{E2}$.

The first partial gearbox 20 has a first gearbox output shaft 44 on which the shift clutches 28, 30 are mounted and which is connected to the first constant gear set 24. Correspondingly, the second partial gearbox 22 has a second gearbox output shaft 46 on which the shift clutches 32, 34 are formed and which is connected to the second constant gear set 26.

As illustrated, the dual-clutch gearbox 10 is formed with output constant gear sets 24, 26. The dual-clutch gearbox 10 could likewise be formed with input-side constant gear sets. Furthermore, the dual-clutch gearbox 10 may be designed for transverse or for longitudinal installation in a vehicle. The arrangement of the gear stages within the respective partial gearbox 20, 22 is selected entirely arbitrarily in the present case. Other arrangements (in particular axial arrangement) are likewise possible.

FIGS. 2 to 7 show successive states of the dual-clutch gearbox 10 during an upshift process from the gear stage 4 into the gear stage 6, with the control method according to the invention being used.

Starting from the state in FIG. 1, the dual-clutch gearbox 10 transmits drive power via the gear stage 4, wherein a relatively high rotational speed level of the drive engine 14 is to be assumed (for example $n_M$=6500 revolutions per minute). The gear stage 5 is pre-selected in the other partial gearbox 20.

Figure 2:
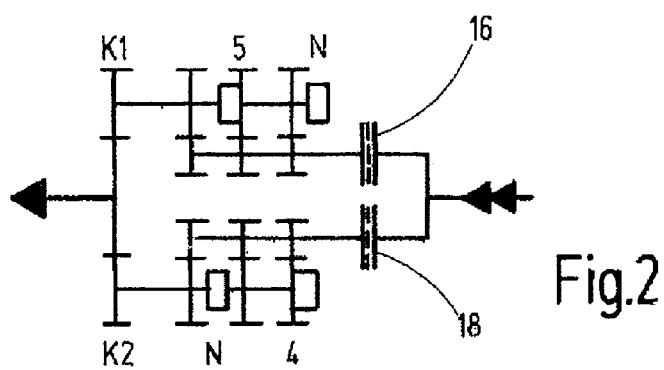

FIG. 2 shows a state in which a cross-over process is taking place from the second partial gearbox 22 to the first partial gearbox 20 by virtue of the second clutch 18 being opened and the first clutch 16 being closed. Such overlapping control processes of the friction clutches 16, 18 are characteristic of dual-clutch gearboxes and are not described in detail here.

Figure 3:
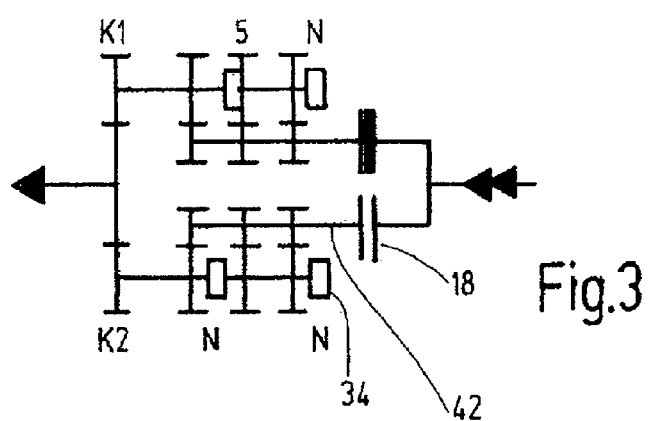

FIG. 3 shows a state in which the second friction clutch 18 is fully open. In said state, the drive power is transmitted via the gear stage 5 of the first partial gearbox 20 to the dual-clutch gearbox output shaft. Furthermore, at said time, the shift clutch 34 is actuated in order to disengage the gear stage 4 (engaging the neutral position N). From said time onwards, the second gearbox input shaft 42 is no longer connected into the power flow, and the rotational speed of said second gearbox input shaft 42 falls solely on account of the inherent friction or the gear set friction. Since the rotational speed of the second gearbox input shaft 42 was relatively high at said time (of the order of magnitude of the above-specified 6500 revolutions per minute), a relatively high differential rotational speed prevails at the shift clutch 32 for the target gear stage 6 even though the rotational speed $n_M$ of the drive engine has already fallen on account of the upshift process from the fourth into the fifth gear.

FIG. 4 shows a state in which the second friction clutch 18 is now briefly acted on with pressure before the shift clutch 32 is actuated in order to engage the gear stage 6. As a result of the reduced rotational speed at the dual-clutch gearbox input shaft 12, a drag torque is hereby exerted on the second gearbox input shaft 42, as a result of which the latter is braked relatively intensely. This process is also referred to as "double-declutching".

The second friction clutch 18 is subsequently re-opened, as shown in FIG. 5, and the shift clutch 32 is subsequently actuated in order to engage the gear stage 6.

FIG. 6 in turn illustrates a cross-over process in which the clutches 16, 18 are involved in order to transfer the drive power from the first partial gearbox (in which, like before, the gear stage 5 is engaged) to the second partial gearbox 22 (in which the sixth gear stage is engaged).

In FIG. 7, the upshift process is ended, with the friction clutch 18 now being fully closed and the first friction clutch 16 being fully open. The drive power is now transmitted via the second partial gearbox 22 (gear stage 6) to the dual-clutch gearbox output shaft 25. In the first partial gearbox 22, the gear stage 5 may remain engaged or be disengaged.

Figure 8:
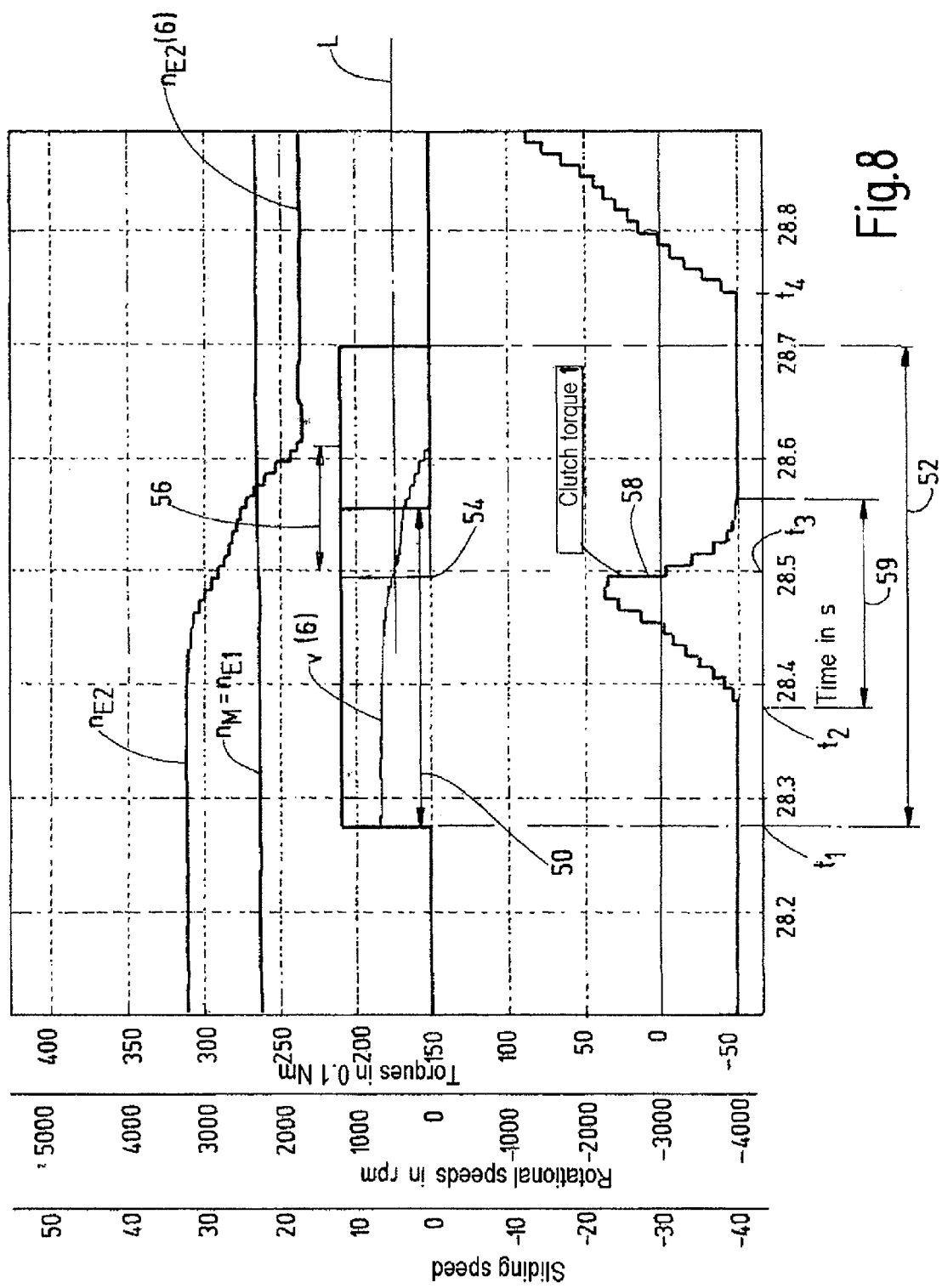
FIG. 8 shows an illustration of rotational speeds, torques and sliding speeds over time during the implementation of a method according to the invention for controlling an upshift process.

Such an upshift process is illustrated in schematic form in FIG. 8. The illustration proceeds from the state in FIG. 3, in which the intermediate gear has already been engaged and drive power is being transmitted via said intermediate gear. Accordingly, the rotational speed $n_M$ of the dual-clutch gearbox input shaft 12 is equal to the rotational speed $n_{E1}$ of the first gearbox input shaft 40. The rotational speed $n_{E2}$ is higher than this. Said relatively high value has the result that the sliding speed v (6) at the synchronizer of the sixth gear is still relatively high at a time $t_1$. From said time to the time $t_3$, double-declutching is possible by exerting pressure in the friction clutch of the free partial gearbox (friction clutch 18 in the example above). The sliding speed v (6) is so high that a synchronization is not permitted, since the sliding speed v (6) has not yet undershot a threshold L.

For this reason, at the time $t_2$, double-declutching is initiated by virtue of pressure being exerted in the friction clutch of the free partial gearbox (friction clutch 18). Here, the drag torque 58 which is transmitted to the gearbox input shaft 42 of the free partial gearbox in this way is increased gradually, specifically in a ramped fashion as shown from the time $t_2$ onwards, up to a maximum value. Shortly before the time $t_3$, a stop condition for the double-declutching is met. Here, the rate of change of the rotational speed $n_{E2}$ is monitored. Once said rate of change has reached a certain threshold value (shortly before $t_3$), the double-declutching is stopped by virtue of the drag torque 58 being reduced again. This may take place abruptly, but in the illustration of FIG. 8, likewise takes place gradually in the form of a ramp or parabola.

From the time $t_3$ onwards, but preferably after the complete depletion of the drag torque 58, the synchronizer of the sixth gear can be actuated. Once the sixth gear is engaged, it is possible thereafter (at the time $t_4$) for the cross-over process to take place, during which drive power is transferred from the first partial gearbox 20 to the second partial gearbox 22, with the friction clutch 18 being actuated as shown by the ramped build-up of torque from the time $t_4$ onwards.

In FIG. 8, 50 denotes a time period within which double-declutching is possible. 52 denotes a time period during which double-declutching is required. Here, at the start of the time period 52, a flag is set when double-declutching is required. Said flag is cleared only when a new gearshift is started. The time 52 consequently corresponds to the set flag.

54 shows a time at which the sliding speed v (6) has undershot a predetermined threshold value. From said time onwards, a synchronization of the target gear is possible. A synchronization is not permitted before this time.

56 denotes a time window within which the synchronizer of the target gear may be active. After the time period 56 following the time 54 has expired, the sliding speed v of the target gear has been reduced to zero, and the target gear is synchronized.

The torque which is transmitted by the friction clutch assigned to the free partial gearbox of the target gear is denoted by 58.

At the time $t_1$, the conditions for double-declutching are all met, such that at a slightly later time $t_2$, the drag torque is applied to the gearbox input shaft of the free partial gearbox, specifically during a double-declutching phase 59. Within said double-declutching phase 59, at the time 54 ($t_3$), the sliding speed v will fall below the threshold value L, such that from said time onwards, a synchronization of the target gear is possible (during the phase 56). The deceleration from $t_1$ to $t_2$ occurs in that no double-declutching torque is applied for as long as the source gear is not disengaged. This behaviour can be deactivated in a calibratable manner.

The above description of a control method according to the invention for an upshift process of a dual-clutch gearbox relates for example to the example of FIGS. 1 to 7, in which an upshift is carried out from the gear stage 4 to the gear stage 6. The diagram of FIG. 8 should however be understood qualitatively and can accordingly also be applied to other shift processes (for example from 1 to 3, from 2 to 4, from 2 to 6, etc.).

Accordingly, FIGS. 9 to 16 show a further example of a control method according to the invention for an upshift process from the gear stage 2 to the gear stage 6. The dual-clutch gearbox which is used for this illustration corresponds to that of FIGS. 1 to 7.

FIG. 9 proceeds from a state in which the gear stage 2 is engaged and drive power is transmitted via the second partial gearbox 22. The first gear stage 3 is pre-selected in the first partial gearbox.

In FIG. 10, a cross-over process takes place to the first partial gearbox, such that in FIG. 11, drive power is transmitted via the first partial gearbox and the gear stage 3 to the drive output. The friction clutch 18 is opened, and the gear stage 2 is disengaged by means of the shift clutch 32.

In FIG. 12, the double-declutching by means of the friction clutch 18 takes place, as a result of which the rotational speed of the gearbox input shaft 42 is reduced.

Figure 13:
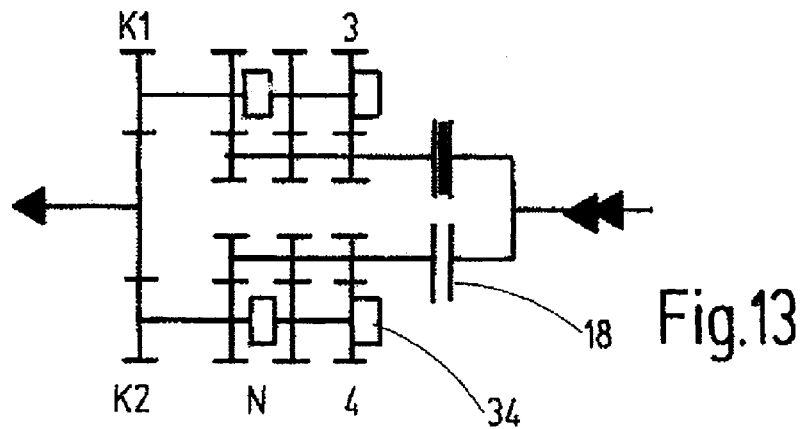
Figure 14:
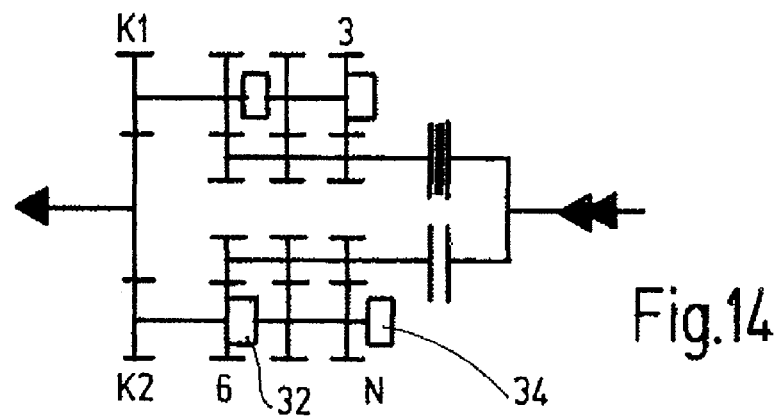
Figure 15:
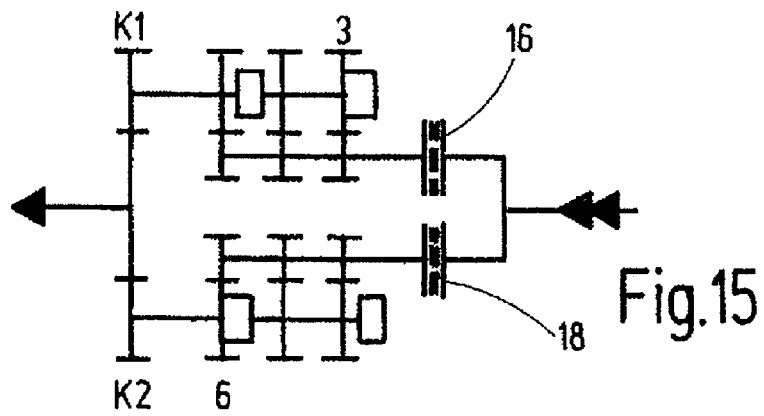

In FIG. 13, with a reduced sliding speed at the synchronizer of the fourth gear, the gear stage 4 is engaged (shift clutch 34). In this way, firstly the synchronizer of the fourth gear is used in order to reduce the rotational speed of the second gearbox input shaft 42 still further. In the step of FIG. 14, the gear stage 4 is disengaged again by means of the shift clutch 34 and the gear stage 6 is engaged by means of the shift clutch 32.

In step 15, the cross-over process takes place again, with the drive power being transferred from the first partial gearbox (with gear stage 3) to the second partial gearbox (with gear stage 6).

Figure 16:
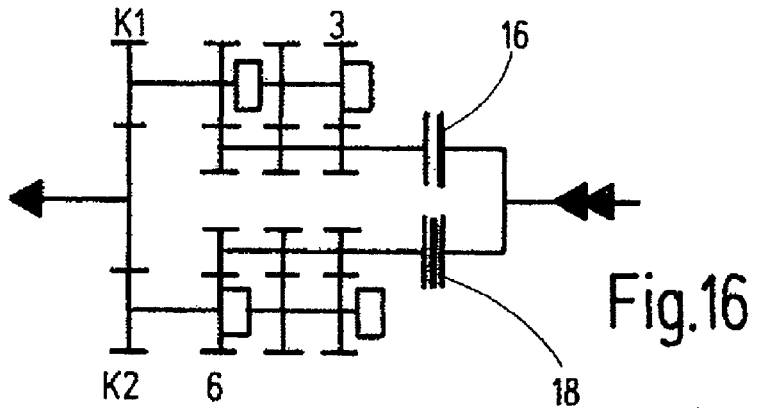

In FIG. 16, the friction clutch 16 is opened again such that the gear stage 6 is now the driving gear.

Figures 17, 18:
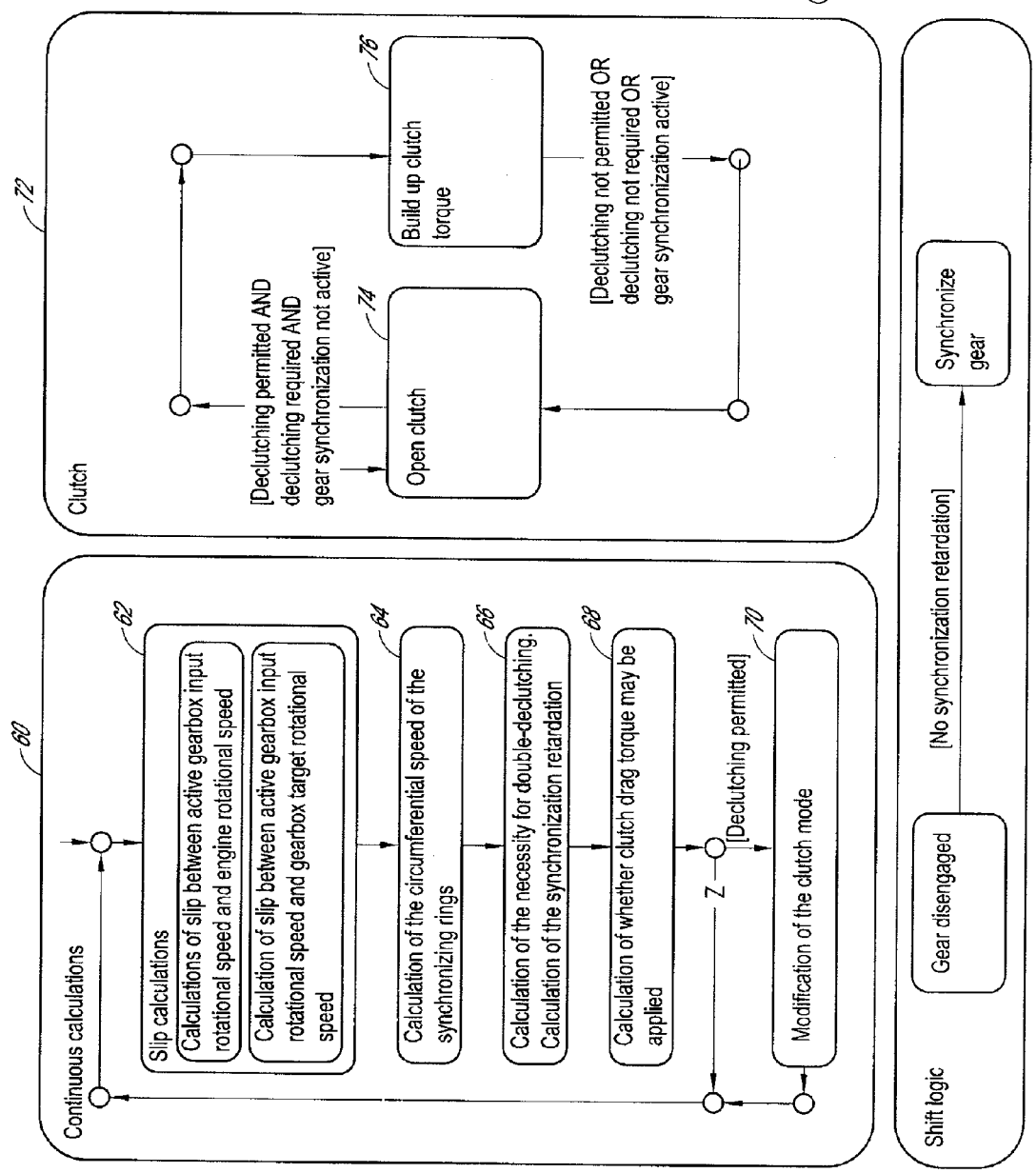
FIG. 17 shows an illustration of a flow diagram for implementing the control method according to the invention, and an illustration of the conditions queried here.
FIG. 18 shows a schematic illustration of a gear set of a target gear stage in order to illustrate the rotational speeds and the sliding speed.

In FIG. 17, 60 denotes a flow diagram which is used for initiating a double-declutching process.

In step 62, slip calculations are firstly carried out, in particular a calculation of the slip between the rotational speed of the respective gearbox input shaft and the engine rotational speed, and a calculation of the slip between the rotational speed of the gearbox input shaft and the rotational speed of that gearbox input shaft to be realized by means of the target gear.

From said slip, the circumferential speed of the synchronizing rings of the target gear is calculated in step 64, that is to say the sliding speed v.

In step 66, it is calculated whether double-declutching is required, and the synchronization deceleration is calculated. In step 68, it is established whether a clutch drag torque may be applied in order to reduce the rotational speed of the gearbox input shaft.

If this is not the case, the flow diagram is run through from the beginning again. If this is the case, the clutch mode is modified in step 70 (or double declutching is initiated).

72 denotes a clutch control module which, in state 74, proceeds from an open clutch. If double-declutching is permitted proceeding from said state and double-declutching is required and the gear synchronizer of the target gear is not active, then in state 76, a clutch drag torque is built up. It is subsequently monitored whether any of the above conditions has changed in the intervening time. If declutching is consequently no longer permitted or declutching is no longer required or else the gear synchronizer of the target gear is active, the clutch is opened again, such that the state 74 is attained.

FIG. 18 is a schematic illustration of a gear set of a gear stage of the dual-clutch gearbox 10 (in the present case, the gear set of the sixth gear stage).

The gear set comprises a fixed gear which is fixedly connected to the gearbox input shaft 42 and which is in engagement with a loose gear which is mounted in an initially freely rotatable manner on the gearbox output shaft 46. The shift clutch 32 comprises a friction ring 78 (synchronizing ring).

$\omega_W$ denotes the rotational speed of the gearbox output shaft 46. $\omega_{LR}$ denotes the rotational speed of the loose gear of the gear set 36. $\omega(6)$ denotes in schematic form the differential rotational speed which is present at the friction ring 78. $v(6)$ denotes the sliding speed which results at the engagement point of the friction ring 78, that is to say the circumferential speed at the synchronizing point.

FIG. 19 contains three tables 80, 82, 84 which illustrate those gearshifts in which double-declutching is particularly advantageous.

It can be seen that the sliding speed is relatively high (10.03 and 11.20 respectively) in particular during the gearshifts 3-5, 4-6 (even at only 0.75 times the maximum rotational speed in the lower gear stage) when no double-declutching takes place (Table 82). The same applies to the gearshifts 1-3, 2-4, 3-5 and 4-6 when the shift process is initiated at maximum rotational speed in the lower gear stage.

If, in contrast, a clutch strategy is permitted, that is to say double-declutching can take place, as shown in table 84, it can be seen that the sliding speed at the target synchronizers is considerably reduced even during the extreme gearshifts specified above, such that the synchronizers are protected or can be designed to be of smaller volume.

Figure 20:
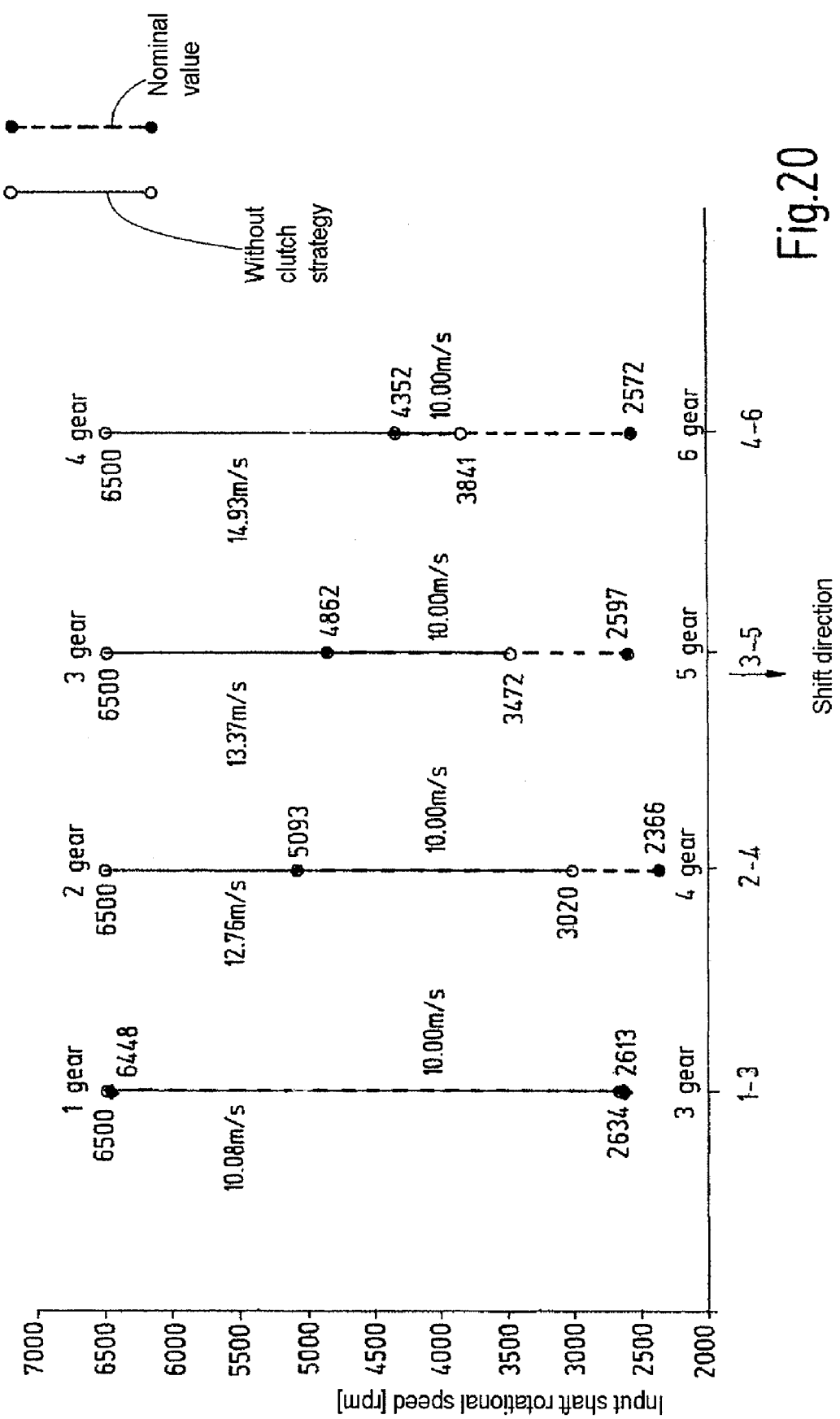
FIG. 20 shows illustrations of rotational speed steps and sliding speeds during upshift processes in a dual-clutch gearbox without and with the use of the method according to the invention.

Finally, FIG. 20 shows the rotational speed steps during the gearshifts 1-3, 2-4, 3-5, 4-6, specifically in the grey (uninterrupted) illustration, more precisely the rotational speed steps without clutch strategy, which can also be seen from the table 82. Black dashed lines show the rotational speed steps which are permitted without a double-declutching strategy and allowing for a maximum sliding speed of 10 m/s. With a double-declutching strategy, as can be seen from table 84, a sliding speed of no greater than 5.93 m/s is attained.

While some embodiments of control methods according to the invention have been described above, the following modifications are also possible.

The control method according to the invention may also be applied to shift processes in which the reverse gear is involved. Here, the necessity for double-declutching may if appropriate be even greater, since relatively high differential rotational speeds can occur here (for example during a synchronization from the reverse gear into the second gear).

Furthermore, double-declutching may also take place in the event of the occurrence of a so-called engagement failure, that is to say if, upon the initiation of a shift process, a shift clutch cannot switch in order to produce the positively locking action in the associated gear set. This may occur on account of jamming or on account of unintentional locking of the locking synchronizer.

In this case, such an engagement failure or shift blockade is detected for example by virtue of the force or energy required for engaging the target gear being monitored. If said force or energy exceeds a certain value over a relatively long time period, it is assumed that a shift blockade is present. In this case, the input-side friction clutch of the associated partial gearbox is briefly acted on with pressure, with a drag torque being transmitted from the input of the gearbox to the gearbox. In this way, the target shift clutch is rotated, as a result of which the shift blockade is generally eliminated. A new synchronization of the target shift clutch may subsequently be begun.

Furthermore, the method according to the invention may be applied not only to upshift processes but rather also to downshift processes, as may be gathered for example from tables 82 and 84. For example, during a downshift process from the gear stage 5 into the gear stage 3, the sliding speed at the target shift clutch can be reduced from 7.90 to 4.90.

During such downshifts, the target rotational speed is higher than the starting rotational speed. By applying the drag torque, the free partial gearbox is accelerated. By withdrawing the drag torque, the gearbox rotational speed can fall again on account of the inherent friction. Oscillation of the application of the clutch torque may be prevented by using suitable measures.

The technological background to the invention will additionally be described below.

The continuous calculation of the sliding speed of the friction rings (synchronizing rings) involved is essential for implementing the algorithm for applying the drag torque.

Said calculation may take place as follows:

Abbreviations:
S Start
T Target
lim Limit value
ins Input shaft, gearbox input
sync Synchronization
Formula Symbols:

| | |
|---|---|
| Rotational speed in rpm: | n [rpm] |
| Individual transmission ratio: | i [—] |
| Transmission ratio constant: | k [—] |
| Overall transmission ratio: | g [—] |

-continued

| | |
|---|---|
| Rotational speed step: | $\Delta n_{ins}$ [rpm] |
| Rotational speed difference: | $\Delta n_{sync}$ [rpm] |
| Diameter, synchronizing ring: | d [m] |
| Circumferential speed, synchronizing ring: | v [m/s] |

Rotational Speed Step

The rotational speed step is the change in the gearbox input rotational speed during the gearshift from the start gear to the target gear. The rotational speed step is calculated as follows:

$$\Delta n_{ins} = n_s \cdot \frac{g_s - g_t}{g_s}$$

Rotational Speed Difference

The rotational speed difference is the difference in rotational speed between the loose gear to be shifted and the rotational speed of the associated gearbox output shaft.

$$\Delta n_{sync} = \frac{n_s}{i_T} \cdot \frac{g_s - g_t}{g_s} = \frac{\Delta n_{ins}}{i_T}$$

The circumferential speed is the speed of the circumference of the synchronizing ring at the synchronizing point. Said circumferential speed is also referred to in this document as the sliding speed.

$$v = \frac{\Delta n_{sync} \cdot \pi \cdot d}{60}$$

The sliding speed constitutes the criterion for the necessity for double-declutching. If said sliding speed exceeds a threshold value, double-declutching is required in order to protect the synchronizing unit.

Whether or not the application of a drag torque to the clutch of the free partial gearbox assists a synchronization process is dependent on the present rotational speed situation.

Double-declutching is expedient only if the differential rotational speed is reduced as a result. By means of the double-declutching, the gearbox input rotational speed is drawn in the direction of the engine rotational speed. The following therefore applies:

Case 1: The Target Rotational Speed is Lower than the Starting Rotational Speed

The clutch may be closed only when the gearbox input rotational speed is still higher than the engine rotational speed.

Case 2: The Target Rotational Speed is Higher than the Starting Rotational Speed The clutch may be closed only when the gearbox input rotational speed is lower than the engine rotational speed.

The sliding speed at the synchronization point is calculated continuously. The double-declutching function is implemented only if the sliding speed lies above the critical value.

During a gearshift, a desired clutch mode is demanded in each case before the gearshift and after the gearshift. Since torque must be demanded by the clutch during double-declutching, when the double-declutching function is active, a clutch mode is demanded which enables a clutch torque to be applied during the gearshift.

The shift logic must tolerate said torque and nevertheless begin to carry out the gearshift. A signal is therefore calculated which provides a true value for small clutch torques. The shift logic tolerates said small clutch torque for its functions with the exception of during the transition to synchronization. The synchronization should begin only when the clutch is actually open.

Furthermore, the drag torque is demanded only when the starting gear has been disengaged. The drag torque of the clutch remains applied for as long as is physically expedient or until the critical sliding speed has been undershot.

Thereafter, either the synchronizing process is retarded further if the sliding speed is still too high, or the gear is synchronized. A retarding of the synchronization without an applied drag torque is possible only when the target rotational speed is lower than the start rotational speed.

The demanded drag torque of the clutch is built up in a ramped fashion. The depletion of the torque takes place abruptly.

If an upshift is being carried out, the target rotational speed lies below the gearbox input rotational speed. In this case, the partial gearbox is retarded as a result of its inherent inertia. When a defined threshold of the rate of change of the rotational speed of the free partial gearbox is reached, the drag torque can then be withdrawn from the clutch.

In the case of downshifts, the target rotational speed is higher than the start rotational speed. By applying the drag torque, the free partial gearbox is accelerated. By withdrawing the drag torque, the gearbox rotational speed can fall again on account of the inherent friction. An oscillation of the application of the clutch torque is prevented by means of suitable measures.

The application of the drag torque for assisting the synchronization process takes place in parallel with the gearshift processes of the shift logic. The retarding of the synchronization has the effect that the actuators are moved to a position close to the synchronizing point and wait there until clearance for synchronization is given.

If no double-declutching is required during a gearshift, the algorithm is not implemented in order to minimize any additional loading of the clutches.

The algorithm for assisting the gear synchronization can be deactivated entirely.

Variants:

By means of statistical evaluation of the driving behaviour, the critical sliding speed may be dynamically adapted, and the service life of clutches and synchronizing units thereby optimized.

By double-declutching during downshifts, it is possible to attain shorter gearshift times. This may also be expedient when the critical sliding speed is not undershot. During certain gearshifts, the synchronizing time may be shorted as a result of the higher synchronization performance of the clutch. During gearshifts with double-declutching, the synchronization time corresponds to the synchronization time of the clutch and of the synchronizer, and during gearshifts without double-declutching, the synchronization time corresponds only to the synchronizing time of the synchronizer.

During powershift traction upshifts, it is possible to attain shorter gearshift times by means of an incomplete torque depletion of the opening clutch during the clutch cross-over. Here, the start gear is disengaged under preload, such that the clutch need not be opened fully for the double-declutching. In this way, the time for complete opening and moving to the double-declutching position is saved.

A ramped depletion of the clutch drag torque (instead of the abrupt depletion described above) is possible in order to protect the clutch actuators.

As long as no drag torque is demanded but the algorithm is active, the clutch should be held before the touch point instead of in the storage position in order to enable faster reaction times.

Double-declutching is possible during a gear synchronization from the reverse gear into the $2^{nd}$ gear in order to assist the synchronization process.

An activation of the double-declutching in order to eliminate engagement failures (tooth to tooth) is possible. After a rotation of the clutch body relative to the guide sleeve by means of the double-declutching, the gear can now be engaged.

What is claimed is:

1. Method for controlling an upshift process in a dual-clutch gearbox having a dual-clutch gearbox input shaft connected to a drive engine, having two friction clutches and having two partial gearboxes, the method comprising the steps:

detecting a demand for a shift from a low source gear into a higher target gear, with the source gear and the target gear being assigned to one of the two partial gearboxes of the dual-clutch gearbox, opening the friction clutch which is assigned to the one partial gearbox and closing the friction clutch assigned to the other partial gearbox in order to transmit drive power via an intermediate gear of the other partial gearbox without an interruption in tractive force, with the rotational speed of the dual-clutch gearbox input shaft being reduced in this way, disengaging the source gear and conducting temporarily a pressure-exertion process in the friction clutch assigned to the one partial gearbox before the engagement of the target gear, with the rotational speed of the one partial gearbox being reduced as a result of the pressure-exerting process by virtue of a drag torque being transmitted to the one partial gearbox by the dual-clutch gearbox input shaft which is rotating at a reduced rotational speed, such that a synchronization of the target gear may be begun at a reduced differential rotational speed, and opening the friction clutch assigned to the other partial gearbox and closing the friction clutch assigned to the one partial gearbox in order to transfer drive power to the target gear without an interruption in tractive force, wherein the pressure-exertion process is carried out according to at least one of: when the differential rotational speed is greater than a certain threshold value, when a sliding speed of a friction ring of a target shift clutch is greater than a certain threshold value, and when the rotational speed of the one partial gearbox is greater than the rotational speed of the dual-clutch gearbox input shaft.

2. Method according to claim 1, with the pressure-exerting process taking place such that the drag torque which is transmitted to the one partial gearbox being built up gradually.

3. Method according to claim 2, with the drag torque being built up in a ramped or stepped fashion.

4. Method for controlling an upshift process in a dual-clutch gearbox having a dual-clutch gearbox input shaft connected to a drive engine, having two friction clutches and having two partial gearboxes, the method comprising the steps:

detecting a demand for a shift from a low source gear into a higher target gear, with the source gear and the target gear being assigned to one of the two partial gearboxes of the dual-clutch gearbox, opening the friction clutch which is assigned to the one partial gearbox and closing the friction clutch assigned to the other partial gearbox in order to transmit drive power via an intermediate gear of the other partial gearbox without an interruption in tractive force, with the rotational speed of the dual-clutch gearbox input shaft being reduced in this way, disengaging the source gear and conducting temporarily a pressure-exertion process in the friction clutch assigned to the one partial gearbox before the engagement of the target gear, with the rotational speed of the one partial gearbox being reduced as a result of the pressure-exerting process by virtue of a drag torque being transmitted to the one partial gearbox by the dual-clutch gearbox input shaft which is rotating at a reduced rotational speed, such that a synchronization of the target gear may be begun at a reduced differential rotational speed, and opening the friction clutch assigned to the other partial gearbox and closing the friction clutch assigned to the one partial gearbox in order to transfer drive power to the target gear without an interruption in tractive force, wherein the pressure-exerting process is ended when a predetermined stop condition is met.

5. Method according to claim 4, with the ending of the pressure-exerting process taking place such that the transmission of the drag torque to the one partial gearbox is ended abruptly.

6. Method according to claim 4, with the ending of the pressure-exerting process taking place such that the transmission of the drag torque to the one partial gearbox is ended in a ramped or stepped fashion.

7. Method according to claim 4, with the predetermined stop condition being a defined threshold value of a rate of change of a rotational speed of the one partial gearbox.

8. Method for controlling an upshift process in a dual-clutch gearbox having a dual-clutch gearbox input shaft connected to a drive engine, having two friction clutches and having two partial gearboxes, the method comprising the steps:

detecting a demand for a shift from a low source gear into a higher target gear, with the source gear and the target gear being assigned to one of the two partial gearboxes of the dual-clutch gearbox, opening the friction clutch which is assigned to the one partial gearbox and closing the friction clutch assigned to the other partial gearbox in order to transmit drive power via an intermediate gear of the other partial gearbox without an interruption in tractive force, with the rotational speed of the dual-clutch gearbox input shaft being reduced in this way, disengaging the source gear and conducting temporarily a pressure-exertion process in the friction clutch assigned to the one partial gearbox before the engagement of the target gear, with the rotational speed of the one partial gearbox being reduced as a result of the pressure-exerting process by virtue of a drag torque being transmitted to the one partial gearbox by the dual-clutch gearbox input shaft which is rotating at a reduced rotational speed, such that a synchronization of the target gear may be begun at a reduced differential rotational speed, and opening the friction clutch assigned to the other partial gearbox and closing the friction clutch assigned to the one partial gearbox in order to transfer drive power to the target gear without an interruption in tractive force, with the synchronization of the target gear taking place only once the friction clutch assigned to the one partial gearbox is opened again after the temporary exertion of pressure.

9. Method for controlling an upshift process in a dual-clutch gearbox having a dual-clutch gearbox input shaft connected to a drive engine, having two friction clutches and having two partial gearboxes, the method comprising the steps:

detecting a demand for a shift from a low source gear into a higher target gear, with the source gear and the target gear being assigned to one of the two partial gearboxes of the dual-clutch gearbox, opening the friction clutch which is assigned to the one partial gearbox and closing the friction clutch assigned to the other partial gearbox in order to transmit drive power via an intermediate gear of the other partial gearbox without an interruption in tractive force, with the rotational speed of the dual-clutch gearbox input shaft being reduced in this way, disengaging the source gear and conducting temporarily a pressure-exertion process in the friction clutch assigned to the one partial gearbox before the engagement of the target gear, with the rotational speed of the one partial gearbox being reduced as a result of the pressure-exerting process by virtue of a drag torque being transmitted to the one partial gearbox by the dual-clutch gearbox input shaft which is rotating at a reduced rotational speed, such that a synchronization of the target gear may be begun at a reduced differential rotational speed, and opening the friction clutch assigned to the other partial gearbox and closing the friction clutch assigned to the one partial gearbox in order to transfer drive power to the target gear without an interruption in tractive force, with an actuator for the friction clutch assigned to the one partial gearbox, during the transfer of the drive power to the other partial gearbox, holding said friction clutch in a position a short distance before the contact point (kiss or touch point) in order to be able to carry out the temporary exertion of pressure with a relatively short reaction time.

10. Method for controlling an upshift process in a dual-clutch gearbox having a dual-clutch gearbox input shaft connected to a drive engine, having two friction clutches and having two partial gearboxes, the method comprising the steps:

detecting a demand for a shift from a low source gear into a higher target gear, with the source gear and the target gear being assigned to one of the two partial gearboxes of the dual-clutch gearbox, opening the friction clutch which is assigned to the one partial gearbox and closing the friction clutch assigned to the other partial gearbox in order to transmit drive power via an intermediate gear of the other partial gearbox without an interruption in tractive force, with the rotational speed of the dual-clutch gearbox input shaft being reduced in this way, disengaging the source gear and conducting temporarily a pressure-exertion process in the friction clutch assigned to the one partial gearbox before the engagement of the target gear, with the rotational speed of the one partial gearbox being reduced as a result of the pressure-exerting process by virtue of a drag torque being transmitted to the one partial gearbox by the dual-clutch gearbox input shaft which is rotating at a reduced rotational speed, such that a synchronization of the target gear may be begun at a reduced differential rotational speed, and opening the friction clutch assigned to the other partial gearbox and closing the friction clutch assigned to the one partial gearbox in order to transfer drive power to the target gear without an interruption in tractive force, with the source gear being disengaged under preload such that the friction clutch assigned to the one partial gearbox need not be opened fully when the drive power is transferred to the other partial gearbox.

11. Method for controlling an upshift process in a dual-clutch gearbox having a dual-clutch gearbox input shaft connected to a drive engine, having two friction clutches and having two partial gearboxes, the method comprising the steps:

detecting a demand for a shift from a low source gear into a higher target gear, with the source gear and the target gear being assigned to one of the two partial gearboxes of the dual-clutch gearbox, opening the friction clutch which is assigned to the one partial gearbox and closing the friction clutch assigned to the other partial gearbox in order to transmit drive power via an intermediate gear of the other partial gearbox without an interruption in tractive force, with the rotational speed of the dual-clutch gearbox input shaft being reduced in this way, disengaging the source gear and conducting temporarily a pressure-exertion process in the friction clutch assigned to the one partial gearbox before the engagement of the target gear, with the rotational speed of the one partial gearbox being reduced as a result of the pressure-exerting process by virtue of a drag torque being transmitted to the one partial gearbox by the dual-clutch gearbox input shaft which is rotating at a reduced rotational speed, such that a synchronization of the target gear may be begun at a reduced differential rotational speed, and opening the friction clutch assigned to the other partial gearbox and closing the friction clutch assigned to the one partial gearbox in order to transfer drive power to the target gear without an interruption in tractive force, with the friction clutch assigned to the one partial gearbox transmitting no more than 20 Nm during the temporary exertion of pressure.

* * * * *